Figure 1:
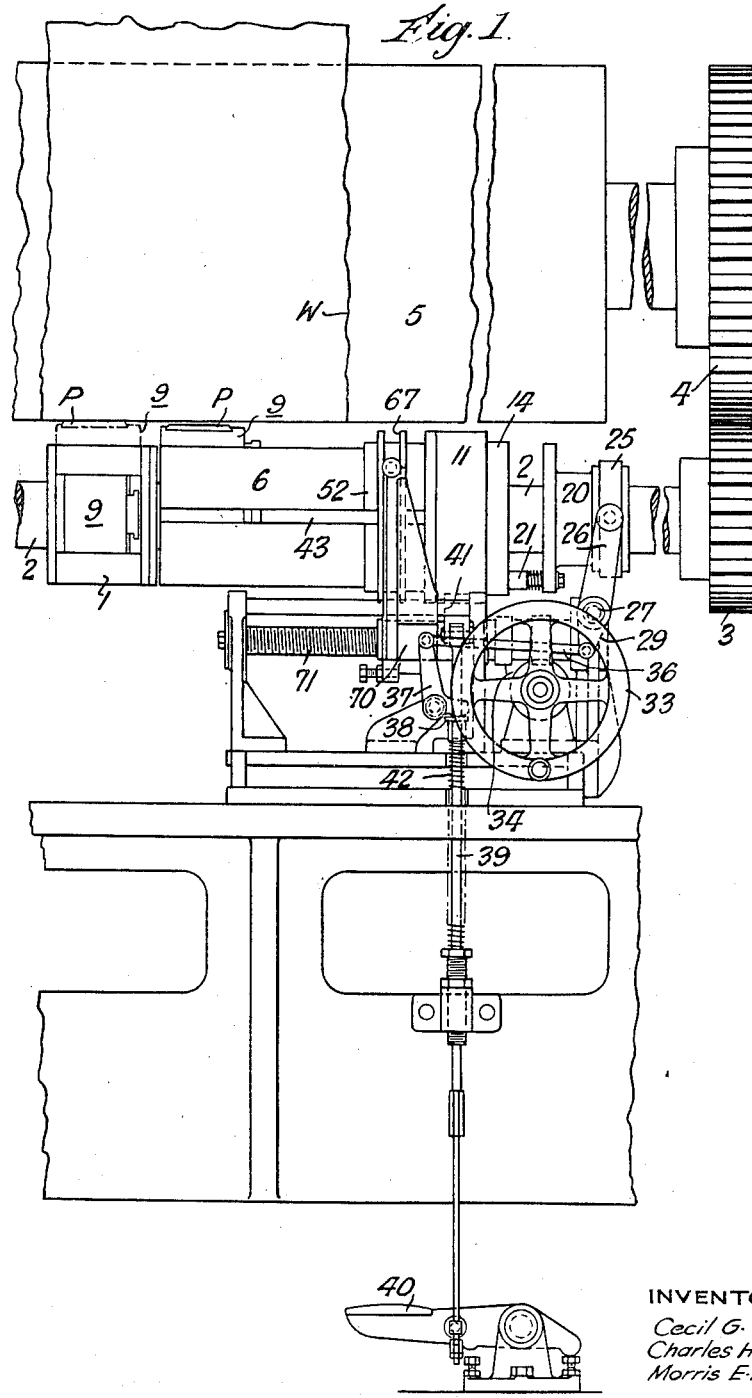

Jan. 2, 1940.   C. G. QUICK ET AL   2,185,310
PRINTING MACHINE
Filed May 7, 1938   9 Sheets-Sheet 2

INVENTORS
Cecil G. Quick
Charles H. Skinner
Morris E. B. Evans
by Albert J. Horton
ATT'Y

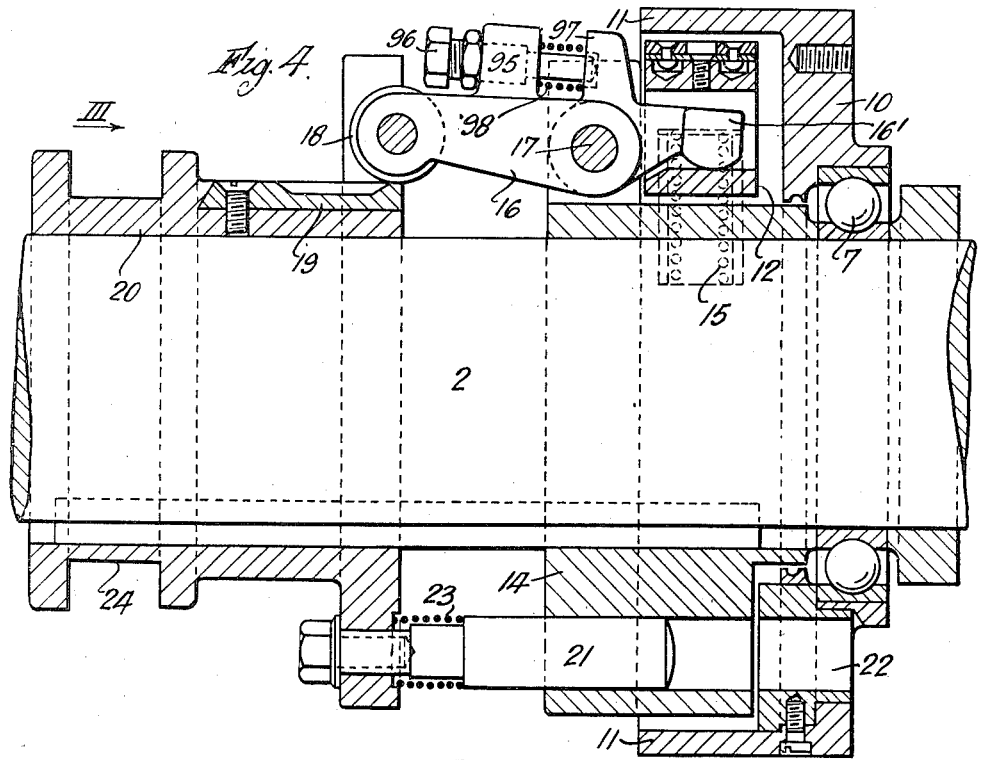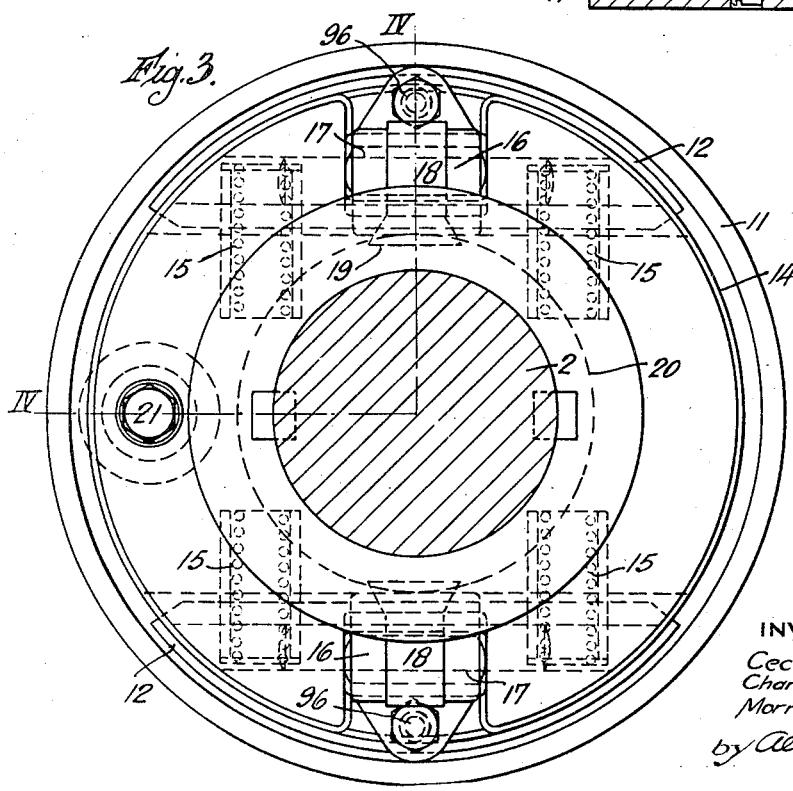

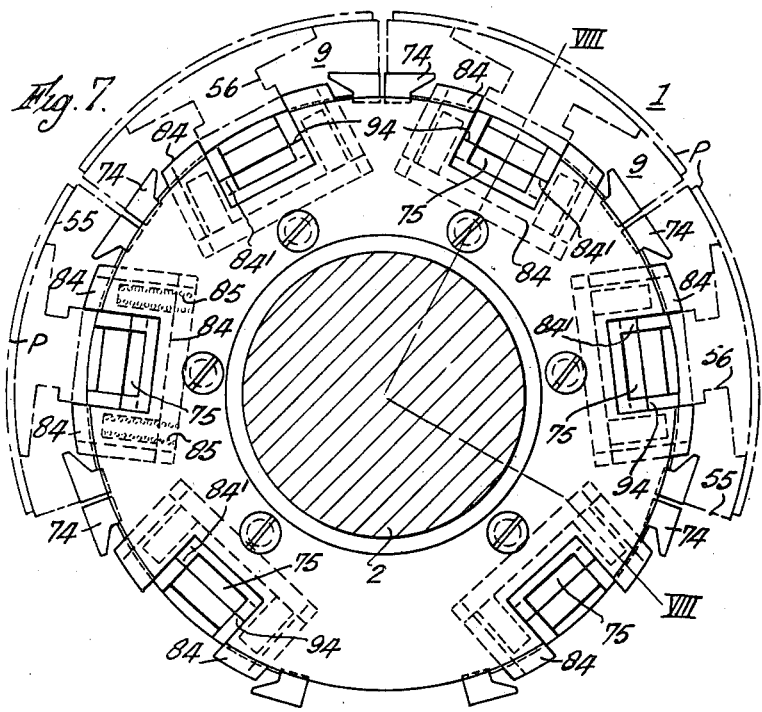
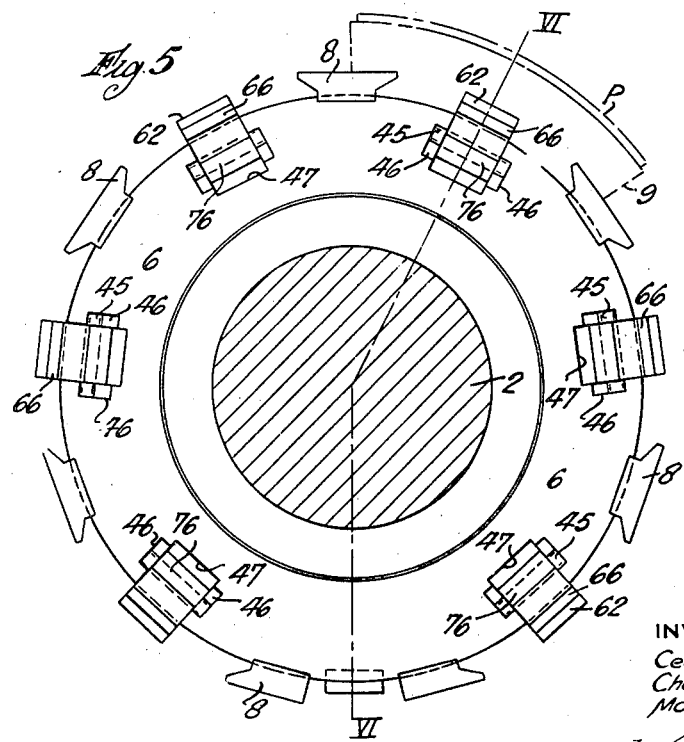

Jan. 2, 1940.  C. G. QUICK ET AL  2,185,310
PRINTING MACHINE
Filed May 7, 1938  9 Sheets-Sheet 5
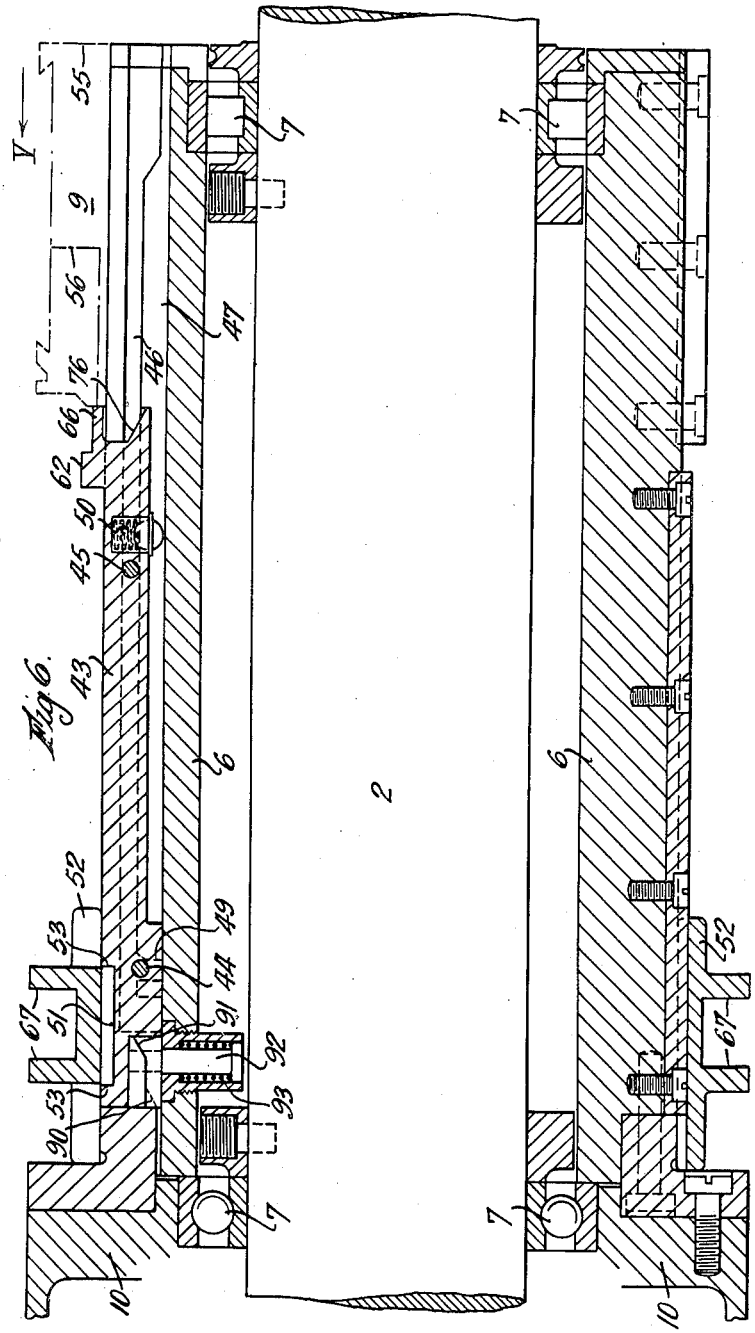
INVENTORS
Cecil G. Quick
Charles H. Skinner
Morris E. B. Evans
by Albert J. Horton
ATT'Y Jan. 2, 1940.  C. G. QUICK ET AL  2,185,310
PRINTING MACHINE
Filed May 7, 1938   9 Sheets-Sheet 6
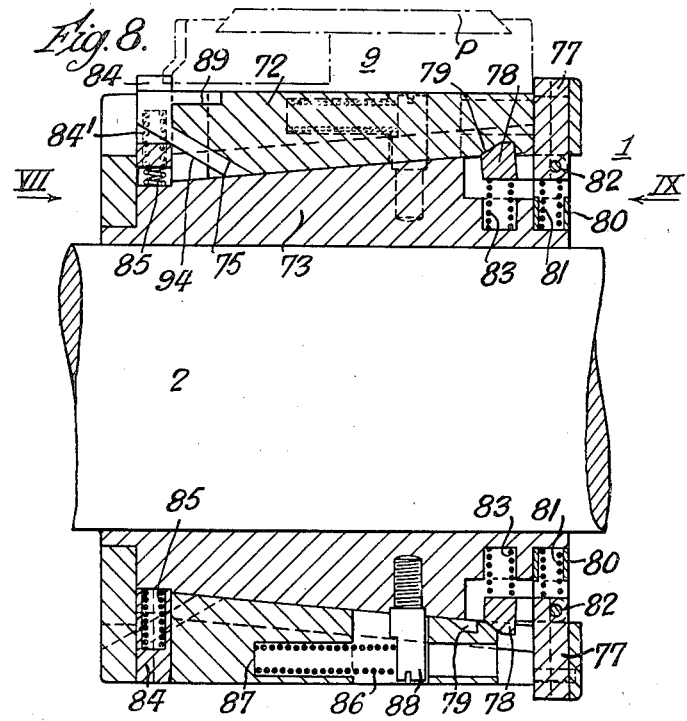
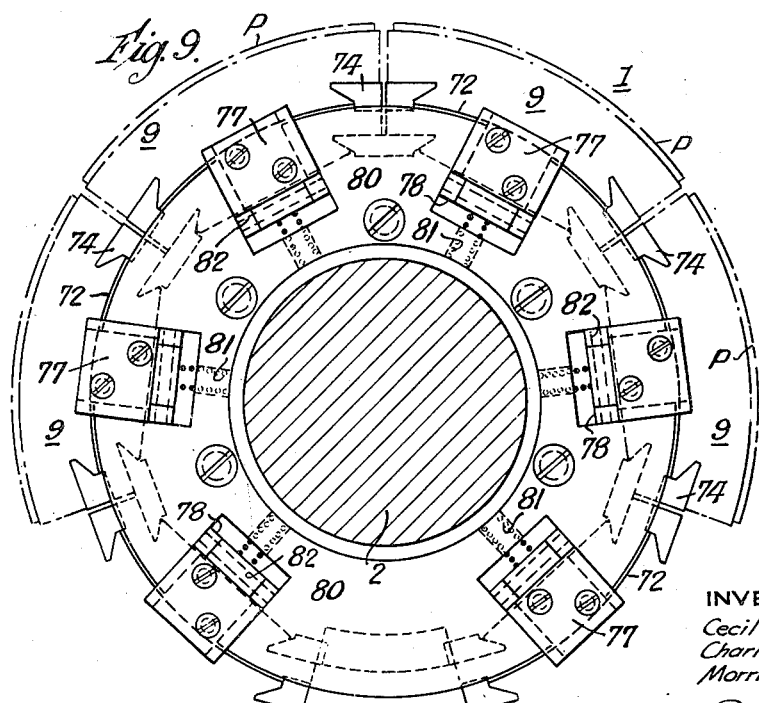
INVENTORS
Cecil G. Quick
Charles H. Skinner
Morris E.B. Evans
by Albert J. Horton
ATT'Y

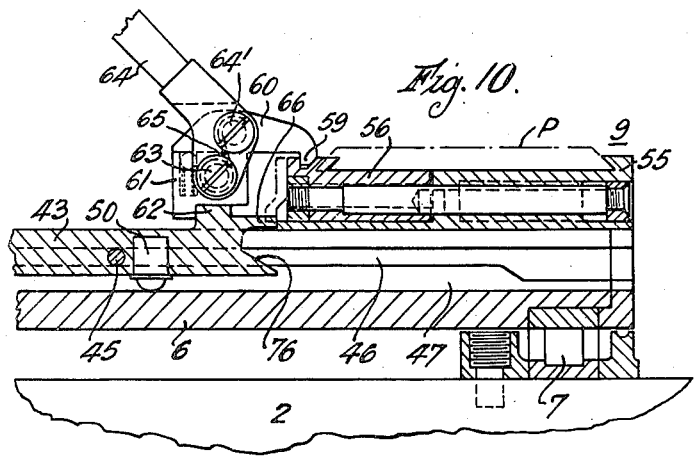
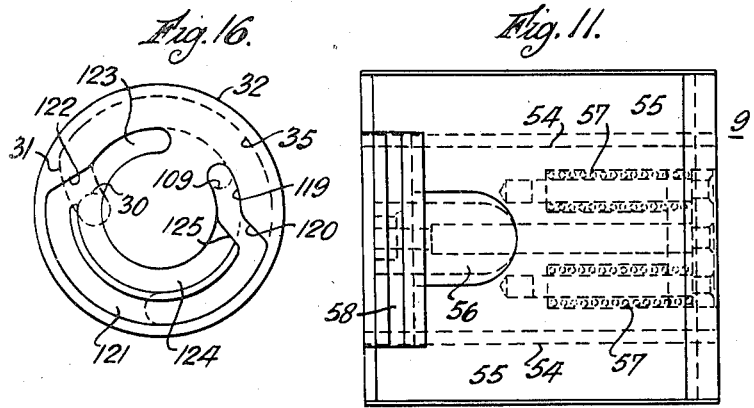
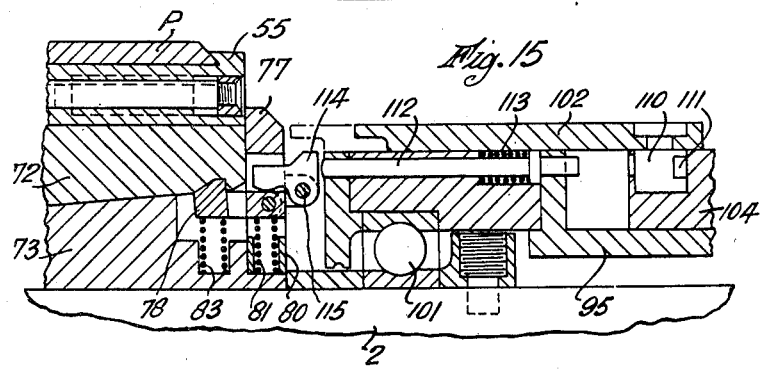

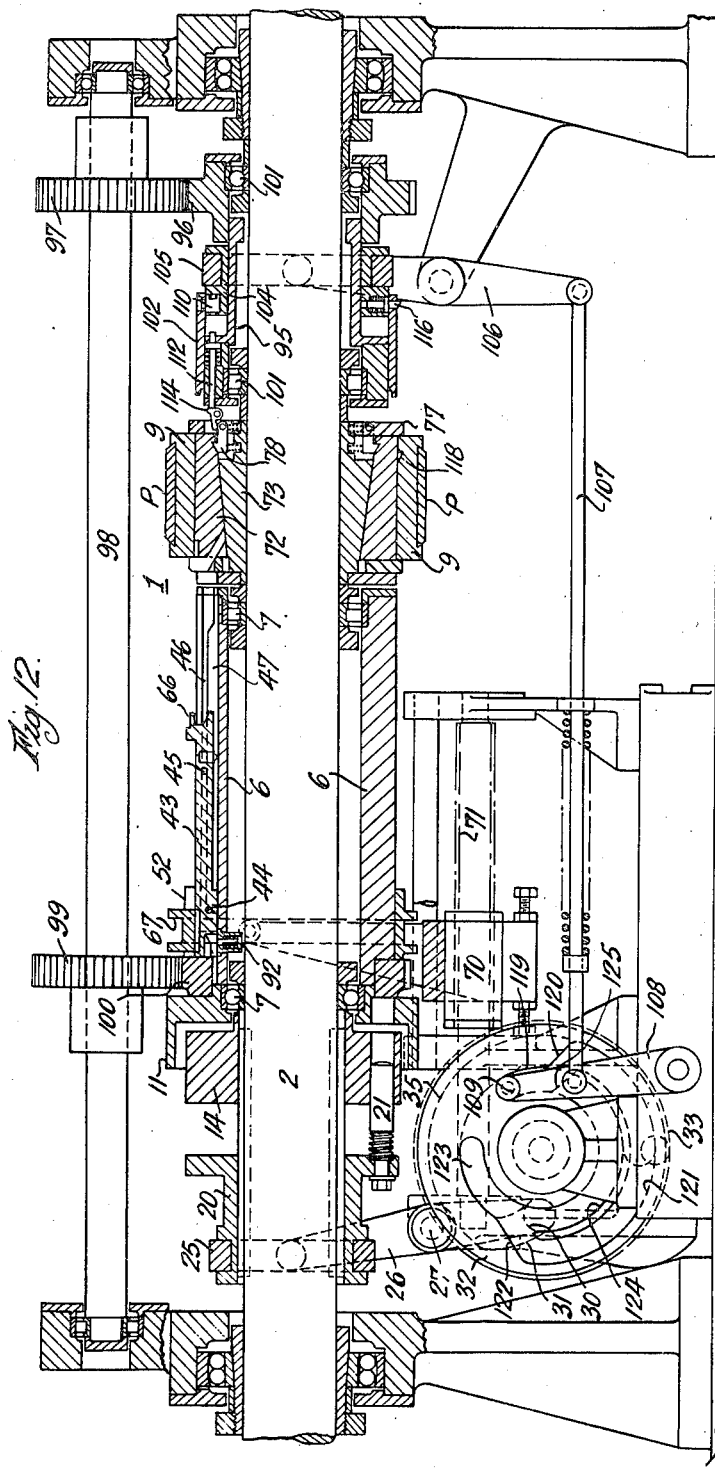

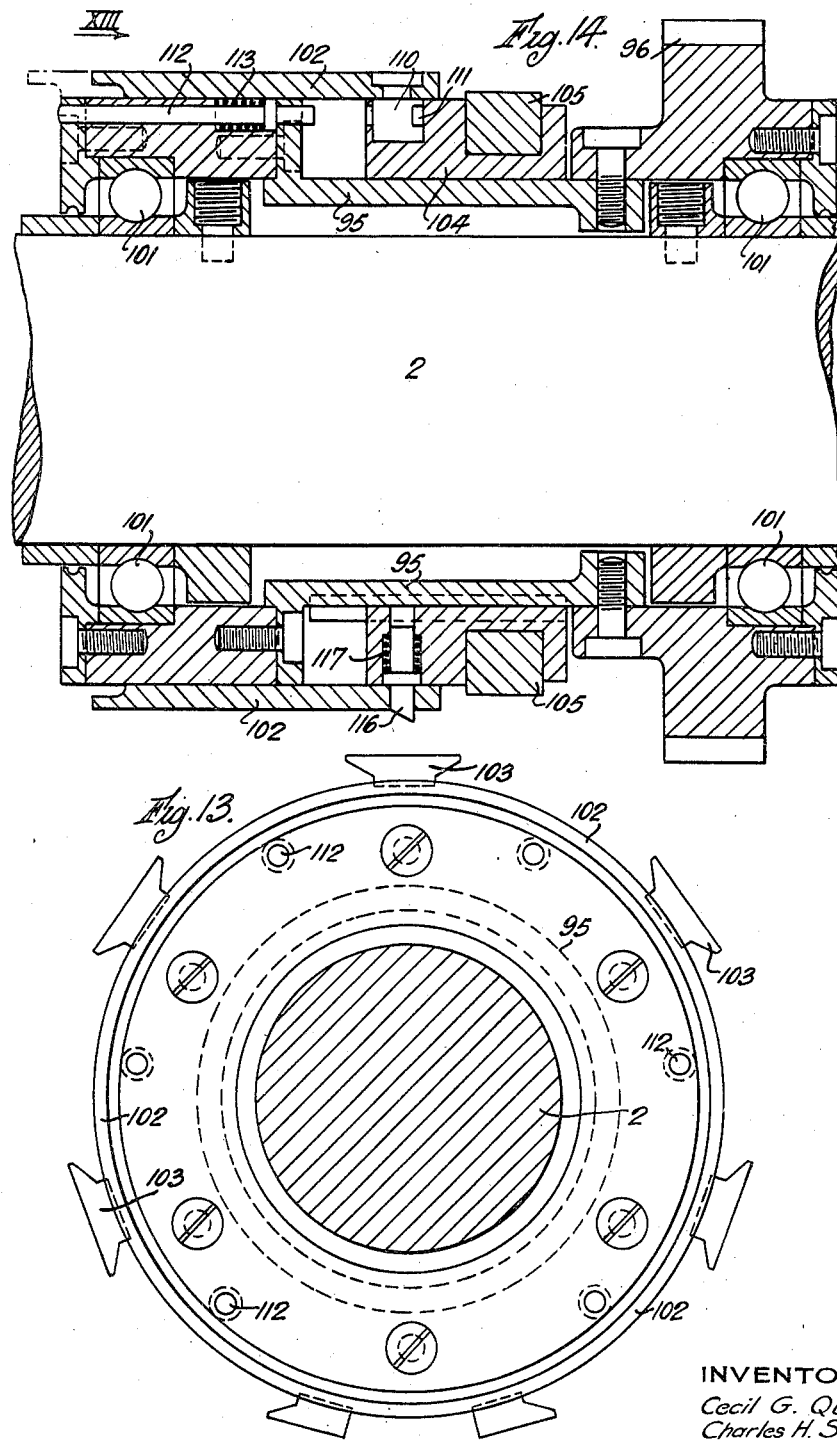

Patented Jan. 2, 1940

2,185,310

UNITED STATES PATENT OFFICE 2,185,310

PRINTING MACHINE

Cecil George Quick, Charles Henry Skinner, and Morris Edward Bilbie Evans, London, England, assignors to R. Hoe & Co. Inc., New York, N. Y., a corporation of New York Application May 7, 1938, Serial No. 206,520
In Great Britain May 14, 1937

12 Claims. (Cl. 101—221)

This invention relates to improvements in printing machines and is particularly concerned with what is generally referred to as rotary "non-stop" printing mechanism by means of which a printing plate or type (hereinafter referred to as a "plate") usually for late news can be added without having to stop the machine.

According to the present invention there are provided a normally rotating impression cylinder, a normally rotating printing head adapted to receive printing plates to print on a web passing between the printing head and the impression cylinder, a normally stationary loading head adapted to receive printing plates clear of the web, means operable to speed up the loading head and to register it with the printing head and means operable so to move a plate from the loading head to the printing head and to bring the plate into contact with the web that movement of the plate transverse of the web is effected only while the plate is clear of the web.

It is preferred to effect the movement of a plate in two sequential steps, the first of which moves the plate transversely of the web while it is clear of the web from the loading head into position on the printing head and the second of which moves the plate on the printing head in a direction which is at right angles to the web, i. e., is transverse to the axis of rotation of the printing head to bring the plate into contact with the web. It is to be observed that since movement of the plate transverse of the web is effected only while the plate is clear of the web, there is no risk, in this movement, of tearing the web, contact between the plate and the web being brought about after the transverse movement has been completed.

The invention can be extended to include the provision of means for removing a plate already on the printing head to make room for a new plate and here again movement of the plate transverse to the web is effected only while the plate is clear of the face of the web.

This result can be achieved by the provision of a third or unloading head which is coaxial with the other two and can, like the charging head, be speeded up and registered with the printing head, this third head being arranged to receive a plate from the printing head as a new plate is being moved from the loading to the printing head: the arrangement is such that the plate which is to be ejected from the printing head has a movement clear of the web before the plate is moved transversely of the web to the unloading head.

The invention is illustrated in the accompanying drawings in which Figures 1-11 are views illustrating one arrangement employing a loading head and a printing head, and Figures 12-16 are views illustrating a modification employing a loading head, a printing head and an unloading head.

Figure 2:
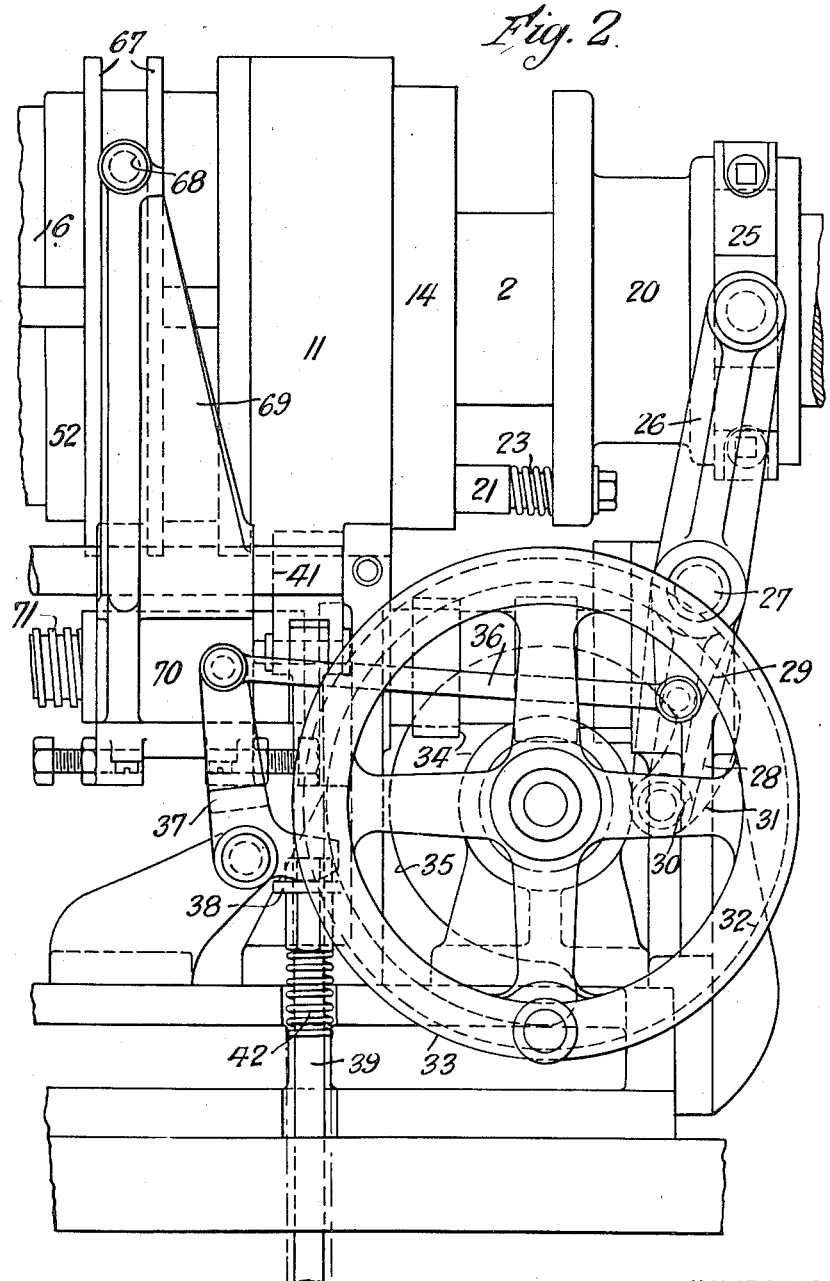

Figure 1 is an elevation showing the general arrangement of the mechanism, Figure 2 an enlarged elevation of the operating mechanism, Figure 3 an end elevation of a clutch, this figure being a view taken in the direction of the arrow III Figure 4; Figure 4 a section on the line IV—IV Figure 3; Figure 5 an end elevation of the loading head, the view being taken in the direction of the arrow V in Figure 6, and Figure 6 a section on the line VI—VI Figure 5; Figure 7 is an end elevation of the printing head looking in the direction of the arrow VII Figure 8; Figure 8 a section on the line VIII—VIII Figure 7; Figure 9 an end elevation looking in the direction of the arrow IX Figure 8; Figure 10 is a detail longitudinal section of a fudge box in position on the loading head and Figure 11 a plan view of the fudge box.

Figure 12 is a longitudinal sectional elevation showing the general arrangement of the modified form of construction; Figure 13 an end elevation of the unloading head employed in this modification, this figure being a view looking in the direction of the arrow XIII Figure 14; Figure 14 is a longitudinal section and Figure 15 a detail section showing the unloading head in co-operation with the printing head.

Figure 16 is a detail view.

Referring firstly to the arrangement shown in Figures 1-11 and referring particularly to the general arrangement shown in Figure 1, I indicates a printing head secured to a shaft 2, the shaft 2 being driven by gears 3, 4 from the shaft of an impression cylinder 5 between which and the printing head passes a web W to be printed. Loosely mounted on the shaft 2 is a loading head 6 which is arranged to receive plates indicated at P below type height, this loading head being normally stationary to enable the plate to be loaded therein. Mechanism is provided whereby the loading head 6 can be speeded up to the speed of the printing head I and registration effected between the two heads I and 6 and further mechanism is provided for enabling a plate P on the loading head 6 to be transferred, while the two heads are rotating at speed, from the loading head 6 to the printing head I. The construction of the loading head will first be described with particular reference to Figures 5 and 6. The loading head 6 comprises a cylinder mounted on bearings 7 carried by the shaft 2; this cylinder is provided with a plurality of wedge shaped blocks 8 to receive between them a plurality of boxes 9 in which printing plates P can be clamped. The boxes 9 are referred to in greater detail hereafter and it is sufficient at this time to observe that when a plate P is clamped into a box 9 the printing or outer surface of the plate is below type height (i. e., with the printing surface of the plate P within the circle which the surface is required to lie on to effect printing on the web W).

In order to effect the speeding up of the cylinder 6 constituting the loading head and registering it with the printing head 1, the following mechanism is provided.

The cylinder 6 has secured to it a member 10 having formed on it a circular clutch drum 11 within which are mounted two clutch pads 12, slidable on a block 14 secured to the shaft 2, the clutch pads being urged by springs 15 to engage the inner surface of the drum 11. The pads 12 are engaged by one end of two levers 16 pivoted at 17 to the block 14. The levers 16, are provided at their other ends with rollers 18 engaged by cam pieces 19 on a sleeve 20 slidable on the shaft 2. The sleeve 20 is also provided with a pin 21 which is slidable in the block 14 and is adapted to enter an aperture 22 formed in the member 10 to provide a positive drive between the shaft 2 and the loading head. The cam pieces 19 are so arranged that when the sleeve 20 is moved to the right as seen in Figure 4 the rollers 18 first drop into a recess in the cam pieces 19 thereby allowing the levers 16 to rock in anti-clockwise direction and so allow the springs 15 to thrust the clutch pads 12 into engagement with the drum 11. Since the clutch pads 12 are carried by the rotating block 14 which is secured to the shaft it will be seen that rotation will be transmitted by the clutch pads 12, from the shaft 2 to the drum 11 and thence to the loading head 6 secured to the drum 11 which is thus speeded up. Further movement to the right of the sleeve 20 causes the unrecessed parts of the cam pieces 19 to engage the rollers 18. This causes the clutch pads 12 to move out of engagement with the drum 11 so that slip occurs between the drum 11 and the clutch pads 12 and during this slip the pin 21 will move round into register with the aperture 22 in the member 10 and (by continuing the movement of the sleeve 20) will be caused to enter the aperture 22. A positive drive to the loading head 6 is thus established and the loading head 6 is brought into circumferential register with the shaft 2 and hence the printing head secured to it. The pin 21 is mounted for slight longitudinal movement in the sleeve 20 and is biased by a spring 23 so that when the pin moves into register with the aperture the spring projects the pin slightly into the aperture and so gives the pin a lead. The necessary longitudinal movement of the sleeve 20 is effected by the following mechanism which is best shown in Figure 2. The sleeve 20 is provided with an annular recess 24 in which is a ring 25 connected to one end of a fork or stirrup lever 26 pivoted at 27 and connected to two arms 28, 29. The arm 28 has a cam bowl 30 which extends into a cam groove 31 formed on a disc 32 arranged to be rotated by a handwheel 33, a step-down gearing indicated generally at 34 being interposed between the handwheel 33 and the disc 32 and the cam groove merges into a concentric portion 35. The portion 31 of the groove operates when the disc 32 is rotated to cause the lever 28 to rock in an anti-clockwise direction as seen in Figure 2 so as to advance the sleeve 20 and thus to cause the speeding up and registering operations already described. The concentric portion 35 of the groove provides a lost motion whereby continued rotation of the handwheel 33 does not affect the lever 28 the purpose of this lost motion being described hereinafter.

The second lever 29 is connected by a link 36 to one arm of a bell-crank 37, the other arm of which abuts against a collar 38 on a rod 39 connected at one end to a pedal 40 (see Figure 1) and at the other end to a brake block 41 arranged to bear against the outer surface of the drum 11. This rod 39 is biased by a spring 42 to urge the brake block 41 against the drum 11 so as to hold the drum (and hence the loading head 6) normally stationary. In order, however, to release the brake to permit the drum 11 to be speeded up in the manner referred to, the initial part of the cam 31 causes the lever 29 to rock and hence through the link 36 and the bell-crank lever 37 to move the brake block 41 from the drum 11, the operation being effected automatically by manipulation of the handwheel 33 which also causes the loading head to be speeded up and registered.

Mechanism will now be described for causing a box 9, into which a plate P has been loaded, to be transferred from the speeded up and registered loading head 6 to the printing head 1 and this mechanism is, moreover, such that only a box which has been loaded with a plate will take part in the transferring operation. The cylinder 6 constituting the loading head is provided with a series of what will be termed pushers 43, there being one pusher 43 for each box position on the cylinder 6. Each pusher operates in a similar manner and, therefore, a detailed description of only one will be given. The pusher is in the form of a bar having two pins 44, 45 both pins being engaged in recesses 46 formed in the walls of a slot 47 in the cylinder 6. The pin 44 is normally within a recess 49 forming a lateral extension or branch of the recess 46 and the pusher is loaded by a spring 50 operating to pivot the pusher in an anti-clockwise direction about the pin 45. The rear end of each pusher is recessed at 51 below a traversing sleeve 52 (common to all of the pushers) which is slidable longitudinally on the cylinder 6, the recess 51 leaving shoulders 53 which, by the pivoting movement of the pusher are moved clear of the sleeve 52. The pusher 43 is, however arranged to be rocked, against the spring 50 in a clockwise direction when a plate P is loaded into the corresponding box 9: this movement causes the shoulders 53 to move into the path of the sleeve 52 so that traversing movement of this sleeve will be imparted to the pusher. This movement of the pusher is effected by the loading of a plate P in the following manner. The boxes 9 are formed with dovetailed projections 54 which enter the dovetailed recesses formed by the blocks 8. The boxes comprise a fixed abutment 55 at one end and a movable abutment 56 which can be moved away from the fixed abutment against the action of springs 57 this movement permitting a plate to be loaded into position between the abutments. To effect movement of the movable abutment it is formed with a recess 58 adapted to receive a beak 59 on a tool 60 slidable on a block 61 recessed to fit over a flange 62 on the forward end of the pusher 43. On the block is also pivotally mounted at 63 an operating lever 64, the lever being biased by a spring 65 to move as seen in Figure 10 in a clockwise direction and the lever 64 being connected by a pivot 64' to the member 60. When this tool is applied to enable a plate to be loaded in the particular box 9, the block 61 has to be pressed on to the forward end of the appropriate pusher 43 with sufficient pressure to cause a flange 66 on the pusher 43 to move below the level of the movable abutment 56. When this has been effected the lever 64 can be rocked to cause the member 60 to slide on the block 61 and also to move the abutment 56 to the left as seen in Figure 10. A plate P can now be loaded between the two abutments and the tool withdrawn, the springs 57 reacting to draw the movable abutment 56 firmly into contact with the plate P. Since, however, the flange 66 on the pusher 43 has been depressed to enable the abutment 56 to slide over it the flange 66 remains depressed even when the tool is withdrawn. Depression of the flange 66 has caused the pusher 43 to rock in a clockwise direction so moving the face 53 into the path of the sleeve 52.

The following mechanism is provided to move the sleeve 52 so that the pushers 43 appertaining to those boxes 9 which have a plate P loaded in them will be operated to transfer the boxes from the loading head 6 to the printing head 1.

The sleeve 52 is formed with flanges 67 receiving between them bowls 68 on a fork member or stirrup 69 which has a screw thread boss 70 engaging a screw threaded rod 71 arranged to be rotated through the gearing 34 from the handwheel 33. The rotation of the screwed rod 71 will cause the sleeve 52 to move to the right as seen in Figure 6 and this motion will be transmitted to those pushers which have, in the manner already described, been caused to move to be in position for engaging the sleeve 52 by the insertion of a plate in the box. It is to be observed that during the continued rotation of the handwheel 33 necessary to rotate the screwed rod 71 the cam follower 30 is received in the concentric part 35 of the cam on the disc 32 so that during the continued rotation the cam follower 30 is unaffected after having caused the loading cylinder to be speeded up and registered.

It is also to be observed that those pushers corresponding to unloaded boxes will remain in the position shown in Figure 6 so that the sleeve 52 will slide idly over them.

The printing cylinder 1 which has already been referred to as being secured to the driving shaft 2 (see Figures 7-9) comprises a plurality of outer parts 72 one for each box position and an inner part 73, the engaging surfaces of the two parts being wedge shaped and the inner part being secured to the shaft. The various outer parts 72 are similar and a description of one will apply to the remainder. Each outer part 72 is provided with blocks 74 which provide between them dovetailed grooves corresponding to the grooves on the loading head, these blocks being adapted to receive between them the dovetailed projections 54 on the boxes 9 containing the plates. The outer part is movable longitudinally of the shaft to a limited extent so that by reason of the wedge shaped engaging surfaces between the inner and outer parts 72, 73, the outer part 72 is caused to move transversely for a purpose which will be hereinafter referred to.

That end of the outer part 72 which is adjacent the loading head 6 is formed with a wedge shaped surface 75 which is disposed to be engaged by the walls of a wedge shaped recess 76 formed in the end of the corresponding pusher 43. The inner part 73 of the printing head has mounted on it a releasable stop 77 and also a detent 78 arranged to engage in a recess 79 in the outer part of the printing head. The stop 77 is constituted by a plate which is slidable radially in an end plate 80 and is biased by a spring 81 to move radially outwards. The catch 78 is pivotally mounted at 82 on the stop 77 and is loaded by a spring 83 to rock in a clockwise direction as seen in Figure 8. In addition the inner part 73 of the printing head is provided with plates 84 one for each box, each plate being urged by springs 85 to move radially outwards. Longitudinal movement of the outer part 72 of the printing head is normally opposed by a spring 86 which reacts between a recess 87 in the outer part of the head and a pin 88 secured to the inner part 73.

It will be understood that the operation of speeding up and registering the loading head with the printing head has caused the dovetailed grooves formed between the blocks 8 on the loading head to be in register with the recesses formed between the blocks 74 on the printing head, these two heads now being at rest with respect to one another so that to transfer a box from the loading head to the printing head it is merely necessary to slide the box from one to the other.

Continued operation of the handwheel 33 advances the sleeve 52 and hence a pusher 43 corresponding to a box 9 which has been loaded with a plate P; this box will, by the ends of the pushers 43 be caused to slide from the loading head 6 on to the outer part 72 of the printing head. This transferring operation of a box 9 from the loading head 6 to the printing head 1 continues until the end of the box meets its stop 77. The printing plate P is now in longitudinal register and it now remains to bring the printing plate P which, it will be remembered is below type height, out to type height to effect printing. This operation is achieved by co-operation between the wedge shaped surfaces 75 on the outer part 72 of the printing head and the correspondingly wedge shaped recess 76 at the ends of the pushers 43. These two surfaces are so timed as to engage and cause the pusher 43 to be rocked (as it continues its movement) about the pin 45 to bring its flange 66 clear of the box 9 at the moment that the other end of the box meets the plate 77. Continued movement of the pusher 43 due to continued rotation of the handwheel 33 will now cause the outer part 72 to move longitudinally leaving the box held against longitudinal movement by the stop plate 77. This relative movement between the outer part 72 and the inner part 73 which is held against longitudinal movement by being secured to the shaft 2, will cause the outer part 72 to ride up the wedge surface and this in turn will move the box transversely of the axis of the head and bring the plate on it into printing contact with the web W passing between the printing plate and the impression cylinder 5. When the outer part 72 has reached the limit of its movement the catch 78 snaps into the recess 79 and holds the outer part 72 against retraction.

The plate 84 has blocks 84' controlled by wedges 84 on the part 72 so that as the part 72 moves to the right the plate 84 is caused by its spring 85 to move up behind the rear end of the box 9 so that the box is held against longitudinal movement in one direction by the stop 77 and in the other direction by the plate 84.

It is to be noted that the flange 66 formed at the forward end of the pusher is, when the pusher is depressed to clear the box, received in a recess 89 formed in the outer part 72.

The operation described having been effected, the handwheel 33 is reversed which causes firstly the pushers 43 to be retracted from the printing head 1 and the drive to the loading head 6 to be discontinued and the head brought to rest by the action of the brake 41 which is re-applied to the drum 11.

In order to re-set those pushers 43 which in the manner described have been employed to transfer a box from the loading head to the printing head, the rear end of each pusher 43 is formed with a wedge surface 90 which when the pusher is retracted by the retraction of the sleeve 52, engages a ramp 91 on a bolt 92 which is mounted to move in the cylinder 6 against the action of a spring 93. This ramp causes (as the pusher 43 is retracted) the pusher to rock in an anti-clockwise direction on the pivot pin 45 and to move the pin 44 into the recess 49 and also to move the pusher clear of the sleeve 52. When a plate is loaded in the manner described into a box, the spring 93 permits the pusher to move in a clockwise direction as already described while being sufficiently strong to rock the pusher when it is retracted.

It will be obvious that only one plate can be loaded on to the printing head or more than one. When with the arrangement described it is desired to remove a box from the printing cylinder 1 the printing mechanism has to be brought to rest to enable the operator to depress the catch 77 which enables the spring 86 to move the outer part 72 down the wedge to its original position and to utilise this movement to release the plate 84, the wedges 84 engage and depress the plate 84 thus allowing the box to be slid to the left back on to the loading head 6.

It is preferred to form the lever 16 for operating the clutch pads 12 in two adjustable parts, one of which is indicated at 16 and the other at 16', the latter part engaging the pads. Both parts are pivotally mounted on the spindle 17 and one part has a lug 95 into which screws a screw 96 bearing against a lug 97 on the other part, a spring 98 being interposed between the two lugs. It will be apparent that by manipulation of the screw 96 the relative angular positions of the two parts can be adjusted and hence the relation between the operating cam 19 and the clutch pads 12 can be adjusted.

The operation of the mechanism shown in Figures 1-11 will now briefly be described. When it is desired to load the printing head 1 with a plate, the plate is inserted in the box 9 on the stationary loading head 6 at the position which it is required the plate shall occupy eventually on the printing head 1, the plate when loaded into the loading head being below type height. This operation of loading this plate into the box presets the corresponding pusher 43 for operation by the advancing sleeve 52. The handwheel 33 is now operated and the operation causes firstly the loading head 6 to be speeded up and registered with the printing head so that the groove in the loading head receiving the loaded box is in line with the corresponding groove on the printing head and since the two heads are rotating together the groove in the loading head forms in effect a continuation of the groove in the printing head. Continued operation of the handwheel 33 causes the pusher appertaining to the loaded box to advance the box on to the printing head, the plate in the box during this operation still being below type height and when the box has moved up to the stop plate 77 on the printing head (at which time the box is in longitudinal printing position but with the plate below type height) the pusher leaves the box and causes the corresponding outer part 72 on which the loaded box rests to move longitudinally of the printing head. This movement produces by reason of the wedge action a transverse movement of the outer part 72 which in turn moves the loaded box transversely, bringing it from below type height out to type height, the plate in the box then operating to print on the web W. Since the operation of transferring a plate from the loading head to the printing head, this involving a longitudinal movement, is effected below type height, there is no risk that the web will be torn by the printing face of the plate in its translational movement, it being noted that the movement necessary to bring the plate to type height is at right angles to the face of the web and so does not involve the risk of tearing it.

Reference will now be made to the arrangements shown in Figures 12-16 in which a new plate can not only be loaded into the printing head but also a plate in the printing head can be removed therefrom without stopping the printing machine. To enable this to be effected means are provided to cause a box already on the printing head to be lowered to below type height and utilising a box which has been loaded with a plate on the loading head 6 to transfer a box already on the printing head to an unloading head which has been speeded up and registered in a manner similar to that employed for speeding up and registering the loading head, this unloading head being capable of being brought to rest to enable the printing plate and its box to be removed.

Referring to Figure 12, the unloading head is generally indicated by the reference 95 and is mounted together with the printing head 1 and the loading head 6 on the shaft 2. This unloading head 95 is formed with a gear wheel 96 in mesh with a gear wheel 97 secured to a lay shaft 98 having a gear wheel 99 meshing with a gear wheel 100 secured to the drum 10 so that when as has already been described, the drum is speeded up and registered with the printing head 1, the unloading head 95 is similarly speeded up and registered with the printing head 1. The unloading head 95 is supported from the shaft 2 by bearings 101 and on this head is slidably mounted a sleeve 102 formed with blocks 103 constituting between them recesses corresponding to the recesses formed on the printing head 1 to receive the boxes 9. The sleeve 102 is also secured to a block 104 engaged by a ring 105 connected to a lever 106 in turn connected through a link 107 to a lever 108. This lever 108 has a cam bowl 109 engaged by a cam formed in the disc 32, which, in the manner already described, has also formed in it the cam groove 31, 35, by which the loading head 6 is caused to be speeded up and registered. The cam grooves, which will be described in greater detail hereafter, operate when the disc 32 is rotated to cause the block 104 and hence the sleeve 102 to move axially on the cylinder 95 to bring the sleeve up to and away from the printing head. This block is formed with a number of selector blocks 110, one for each box position. These blocks are formed with faces one of which is recessed at 111 and the other unrecessed, and these blocks are in line with plungers 112 which are slidable in the head 95: when the blocks present their unrecessed face to the plungers, the plungers are caused to partake of the longitudinal movement of the sleeve 102 towards the printing head and when the recessed faces are presented to the plungers, the plungers are received in the recesses 111 and so do not partake of this movement. Hence by turning the blocks, selection can be made as to those plungers which will be moved endwise. The forward end of each plunger is adapted when it is moved to engage a lever 114 which is pivotally mounted at 115 on the printing head, the printing head being otherwise as already described. This lever 114 is adapted, when engaged by its plunger 112 to rock in an anti-clockwise direction and to move the retaining latch 78 against the action of its spring 83 and also the stop 77 against its spring 81 and in this manner to allow the outer part 72 to slide down the wedge under the action of its spring 86 and also to clear the stop 77 from its box 9. The movement of the outer part 72 also moves the plate 84 down in the manner already described so that the box is freed from restraint against longitudinal movement.

The movement of the outer part 72 allows its box 9 together with its printing plate P to move transversely to bring the plate to below type height out of its impression or printing position.

The outer surface of the sleeve 102 is disposed so that it is in line with the outer surface of the outer parts 72 where they are in their lowered position and with the grooves between the blocks 103 on the sleeve 102 in angular register with the corresponding grooves between the blocks 74 on the printing head. The action of moving the sleeve 102 to the left as seen in Figure 14 results in bringing the left hand end of the sleeve 102 into close proximity to the right hand end of the printing head; in order now to transfer a box which has been lowered to below type height from the printing head 1 to the sleeve 102 on the unloading head 95, it is merely necessary to slide the box from the lowered outer part 72 of the printing head to the sleeve 102. This is effected by utilising a box 9 in a corresponding position on the loading head 6 to engage and transfer a box 9 on the printing head to the unloading head as the box on the loading head is moved on to the printing head, this operation being effected while the two plates P in the two boxes are below type height.

The sleeve 102 is provided with pins 116 biased by springs 117 to snap into recesses 118 in the boxes when they are moved on to the sleeve 102 from the printing head 1. The box 9 which has been transferred from the loading head 6 to the printing head 1 will be caused to move transversely to type height, this operation being effected by the pushers 43 in the manner already described with reference to Figures 1–11 and this operation occurring after a box has been transferred to the unloading head and the new box has reached longitudinal printing position on the printing head.

In this modification the final forward movement of the handwheel 33 causes the sleeve 102 to move longitudinally away from the printing head and moreover this movement is timed to occur before the pusher is caused to drop from engagement with the new box moved on to the printing head so that the plungers 112 release the lever 114 and allow the stop 77 and the catch 78 to return to their original position, firstly to hold the new box against longitudinal movement to the right and secondly to allow the catch 78 to spring into engagement with the outer part 72 when (by continued forward rotation of the handwheel 33) it receives its longitudinal movement to raise the plate on the new box to type height.

To enable the necessary synchronisation to be effected the cam disc 32 is provided not only with the cam groove 31, 35 for operating the clutch and register mechanism but also with a cam groove for operating the slidable part of the unloading head.

This latter cam groove consists of a concentric part 119 from which merges a cam part 120 opening to a concentric part 121 which by a cam part 122 merges into a concentric part 123 and a return concentric part 124 which is inclined and where it opens to the part 120 forms a shoulder 125. When the parts are in their normal position of rest, the bowl 109 is received in the part 119 and the bowl 30 is in the cam part 131. When now it is desired to load a new plate P in the printing head and to discharge the old plate P to the unloading head, the disc 32 is rotated in an anti-clockwise direction as seen in Figure 12 and Figure 16. The first motion of the disc operates the bowl 30 through the cam 31 to speed up and register the loading head 6 and the unloading head 95, the bowl 109 being during this operation received in the concentric part 119 so that the bowl is idle. The bowl 109 then meets the shoulder 125 which deflects the bowl into the part 120 which causes the sleeve 102 on the unloading head to move up to the printing head 1 and to operate (by the selected pusher 112) to allow the corresponding part 72 on the printing head to run down the wedge and so to allow the box 9 on the printing head to move below type height as already described. During this operation the bowl 30 is within the concentric part 35 of its cam groove so that this bowl is unaffected and remains so by the continued rotation of the disc. The bowl 109 has moved into the concentric part 121 so that continued rotation of the disc leaves this cam bowl unaffected, the continued rotation of the disc representing the movement of the screwed rod 71 to move the new box 9 from the loading head 6 to the printing head 1 and to eject the box already on the printing head to the unloading head. The bowl 109 now moves into the cam part 122 before the anti-clockwise rotation of the disc 32 has been completed and this part 122 operates on the bowl 109 to move the sleeve 102 (and with it the box transferred to it) quickly away from the printing head. The cam bowl 109 is now received in the concentric part 123 so that continued rotation leaves the sleeve 102 unaffected while continued rotation of the handwheel 33 causes the pushers 43 to move the part 72 up the wedge to move the box on the printing cylinder out to type height so completing the unloading and loading operations.

The disc 32 is now reversed and the bowl 119 moves idly in the concentric part 123, 124 and drops over the shoulder 125 into the part 119 to its original position in readiness for a further operation. During this time the bowl 30 has moved through its concentric part 35 while the pushers 43 are retracted and then the bowl 30 moves into its cam part 31 to operate to disconnect the drive to the loading and unloading heads to bring them to rest.

It will be seen that in this modification the necessary translational or longitudinal movement of a plate P to bring it from the loading head 6 to the printing head 1 or from the printing head 1 to the sleeve 102 of the unloading head 95 is effected only while the surface of the plate P is below type height so avoiding any risk of tearing the web W.

In the constructions described with reference to the drawings the two parts of the wedge operating mechanism form an integral part of the printing head. In a modification the two parts of the wedge can be constituted by an assembly which is slidable from the loading head to the printing head and consists of two parts having a wedge surface between them. These two parts are loaded by a spring of such strength that when a pusher pushes on the inner part, the spring causes the outer part to move together with the inner part on to the printing head. The outer part of the device then comes against a fixed stop and continued movement of the pusher moves the inner part longitudinally with respect to the outer part against the action of the spring and this brings into play the wedge which forces the outer part up to printing height in a direction transverse to the axis of the printing head.

It will be apparent that since in the arrangement shown in Figures 1-11 the loading head 6 has to be speeded up and registered with the printing head 1 before the plate P can be moved into printing position, it is impossible to bring a stationary printing plate P into contact with the running web W and also, so long as the printing plate P is in printing position it is carried by the printing head which is geared to the impression cylinder so that it is impossible to bring the printing plate P to rest relative to the impression cylinder and web W.

Similarly in the arrangement shown in Figures 11-16, not only must a new plate P be speeded up and registered with the printing head before the plate can be moved into contact with the web W, but also, in the unloading operation, the plate P to be unloaded is first moved out of contact with the web W before it can be transferred to the unloading head and brought to rest.

It will be understood that the boxes 9 can be arranged to receive slugs instead of printing plates P and that the reference made in this specification and in the appended claims to a plate is employed for convenience and is intended to include a printing surface formed by slugs.

What we claim is:

1. Late news printing mechanism comprising an impression cylinder, a printing head adapted to receive printing plates to print on a web passing between the head and the cylinder, means normally rotating the head and the cylinder together, a normally stationary loading head adapted to receive printing plates below type height, means to speed up the loading head and register it with the printing head, and means to move a plate from the loading head to the printing head in two sequential steps, the first of which moves the plate while below type height into longitudinal printing position on the printing head and the second of which moves the plate in a radial direction to type height.

2. Late news printing mechanism comprising an impression cylinder, a printing head adapted to receive printing plates to print on a web passing between the head and the cylinder, means normally rotating the head and cylinder together, a loading head adapted to receive printing plates below type height, means supporting the loading head co-axially with and to one side of the printing head, means to speed up the loading head and bring it into register with the printing head, and means to move a plate from the loading head to the printing head while they are relatively at rest, the said means moving the plate in two sequential movements, the first of which slides the plate longitudinally while below type height from the loading head to the printing head and the second of which moves the plate radially to bring it to type height on the printing head.

3. Late news printing mechanism comprising an impression cylinder, a printing head adapted to receive printing plates to print on a web passing between the head and the cylinder, means normally rotating the head and the cylinder, a loading head adapted to receive printing plates below type height, an unloading head adapted to receive plates below type height, means supporting the loading and the unloading heads co-axially with and on opposite sides of the printing head, means to speed up the loading and unloading heads and to register them with the printing head, means to slide a plate longitudinally from the loading head to the printing head and from the printing head to the unloading head while the heads are relatively at rest, and means to move a plate radially to the axis of the printing head, the said radially moving means operating to move the plate to type height after the longitudinal moving means has moved a plate from the loading head to the printing head and the said radially moving means operating to move the plate to below type height before the longitudinal moving means moves a plate from the printing head to the unloading head.

4. Late news printing mechanism comprising an impression cylinder, a printing head, means normally rotating the cylinder and head, means to guide a web to be printed between the head and the cylinder, a normally stationary plate receiving means to receive a plate below type height, means to speed up the plate receiving means to the speed of the head, means to move a plate below type height between the speeded up receiving means and the head, means to move the plate at right angles to and away from the axis of the printing head to bring the plate to type height after the plate has been moved longitudinally on to the printing head and means to move a plate on the printing head at right angles to and towards the said axis before the plate is moved longitudinally from the printing head.

5. Late news printing mechanism comprising an impression cylinder, a printing head, a loading head, an unloading head, means supporting the three heads co-axially with the loading and unloading heads on opposite sides of the printing head, means normally rotating the impression cylinder and the printing head, means to guide a web to be printed between the printing head and the cylinder, means on the three heads to receive a plurality of printing plates, with the surface of the plates below type height, means to speed up the loading and unloading heads and to register the plate zones thereon with the corresponding box zones on the printing head, a plurality of transferring members to move plates longitudinally from the loading head to the printing head and from the printing head to the unloading head, a single operating member, means set by the insertion of plates in the loading head to connect the transferring members for operation by the operating member, means to move plates on the loading head towards and away from the axis of the printing head to move a plate into and out of type height, selector members to move selected plates on the printing head towards the axis, means operable by the transferring members to move the plates away from the axis after plates have been moved on to the printing head and timing means to cause the selector members to operate before the transferring means operates.

6. In a late news device for a web printing machine, a rotary printing head adapted to receive a printing plate with its printing surface below type height, a loading head adapted to receive a printing plate while in stationary non-printing position and support the plate with its surface below type height, means to rotate the loading head and accelerate it to the speed of the printing head, pusher means operable to transfer the plate from the loading head to the printing head, elevating means to effect movement of the plate radially into printing position, and a manually operated member connected to the several means and arranged to operate them in sequence.

7. In a late news device for a web printing machine, a rotary printing head adapted to receive a printing plate with its printing surface below type height and arranged to move said plate radially into and out of printing position, a loading head adapted to receive a printing plate while in stationary position and support the plate with its surface below type height, means to rotate the loading head and accelerate it to the speed of the printing head, an unloading head adapted to receive a printing plate from the printing head with its surface below type height, pusher means operable to transfer a plate from the loading head to the printing head and to simultaneously transfer another plate from the printing head to the unloading head, and a manually operated member connected to the several means and arranged to operate them in sequence.

8. In a late news device for a web printing machine, a rotary printing head having a plurality of plate receiving positions, each of which is adapted to receive a printing plate with its printing surface below type height and which is arranged to move said plate in a radial plane into and out of printing position, a loading head having a plurality of plate receiving positions and adapted to receive a plate in a selected position while stationary and support the plate with its surface below type height, means to rotate the loading head and accelerate it to the speed of the printing head, an unloading head adapted to receive a plate from the printing head with its surface below type height, means operable to transfer a plate from the loading head to the printing head and to simultaneously transfer another plate from the printing head to the unloading head, and a manually operated member connected to the several means and arranged to operate them in sequence.

9. In a late news device for a web printing machine, a rotary printing head having a plurality of plate receiving positions, each of which is adapted to receive a printing plate with its printing surface below type height and which is arranged to move said plate in a radial plane into and out of printing position, a loading head having a plurality of plate receiving positions and adapted to receive a plate in a selected position while stationary and support the plate with its surface below type height, said loading head having a pusher member associated with each position and selectively actuated by a plate positioned on the loading head for transferring the plate to the printing head, means to rotate the loading head and accelerate it to the speed of the printing head, an unloading head adapted to receive a plate from the printing head with its surface below type height, and means operable to transfer a plate from the loading head to the printing head and to simultaneously transfer another plate from the printing head to the unloading head.

10. In a late news device for a web printing machine, a rotary printing head having a plurality of plate receiving positions, each of which is adapted to receive a printing plate with its printing surface below type height and having elevating mechanism operable to move the plate in a radial plane into printing position, a loading head adapted to receive a printing plate while in stationary non-printing position and support the plate with its surface below type height, clutch means to rotate the loading head and accelerate it to the speed of the printing head, and a transfer member operable to transfer the plate from the loading head to any selected position on the printing head and to operate the elevating mechanism to raise the plate into printing position.

11. In a late news device for a web printing machine, a rotary printing head adapted to receive a printing plate with its printing surface below type height and having elevating mechanism operable to move the plate in a radial plane into printing position, a loading head adapted to receive a printing plate while in stationary non-printing position and support the plate with its surface below type height, clutch means to rotate the loading head and accelerate it to the speed of the printing head, a transfer member operable to transfer the plate from the loading head to the printing head and to operate the elevating mechanism to raise the plate into printing position, and releasable means to lock the plate in printing position.

12. In a late news device for a web printing machine, a rotary printing head adapted to receive a printing plate with its printing surface below type height and having elevating mechanism operable to move the plate in a radial plane to printing position, a loading head adapted to receive a printing plate while in stationary non-printing position and support the plate with its surface below type height, clutch means to rotate the loading head and accelerate it to the speed of the printing head, a transfer member operable to transfer the plate from the loading head to the printing head and to operate the elevating mechanism to raise the plate into printing position, releasable means to lock the plate in printing position, an unloading head having means to actuate the said releasable means to unlock the plate in printing position for removal of the plate from the printing head with its printing surfaces below type height, and means to decelerate the unloading head and bring it to rest.

CECIL GEORGE QUICK.
CHARLES HENRY SKINNER.
MORRIS EDWARD BILBIE EVANS.